April 12, 1938.   B. G. MILLER   2,114,148
DEPTH INDICATOR FOR TANKS
Filed July 20, 1937
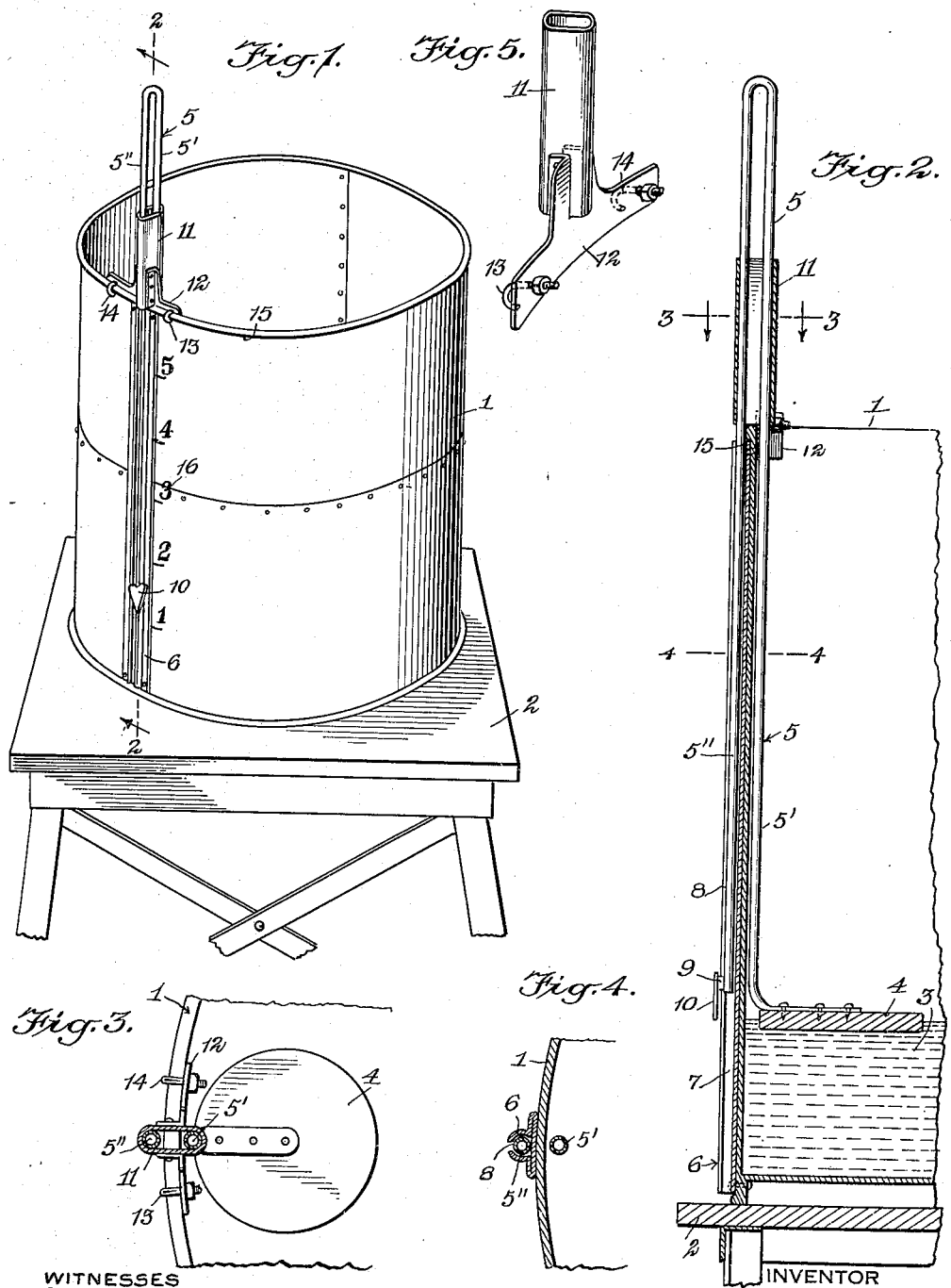
INVENTOR
B. G. Miller
BY
Munn Anderson & Liddy
ATTORNEYS Patented Apr. 12, 1938

2,114,148

UNITED STATES PATENT OFFICE 2,114,148

DEPTH INDICATOR FOR TANKS

Ben G. Miller, Santa Fe, N. Mex.

Application July 20, 1937, Serial No. 154,583

3 Claims. (Cl. 73—322)

This invention relates to indicators for containers and particularly to an improved depth indicator for liquid carrying tanks, the object being to provide a construction which will accurately indicate at a distance the level of the liquid in the tank.

Another object of the invention is to provide an indicator for tanks which is simple in construction and which indicates exteriorly of the tank the level of the liquid in the tank in a way to cause a person to visualize the quantity of liquid still in the tank.

A further object, more specifically, is to provide a gauge for a liquid carrying tank having a U-shaped indicating rod straddling the wall of the tank with means interiorly of the tank acting as a float and means exteriorly of the tank acting to indicate the level of the liquid supporting the float.

In the accompanying drawing:

Fig. 1 is a perspective view showing a tank on a suitable support and an indicator properly applied to the tank;

Fig. 2 is a fragmentary sectional view through Fig. 1 approximately on the line 2—2, the same being on an enlarged scale;

Fig. 3 is a sectional view through Fig. 2 approximately on the line 3—3;

Fig. 4 is a sectional view through Fig. 2 approximately on the line 4—4;

Fig. 5 is an enlarged perspective view of a guide with associated parts embodying certain features of the invention.

Referring to the accompanying drawing by numerals, 1 indicates a tank which may be supported on the ground or any other support, as for instance the stand 2. As far as the invention is concerned, tank 1 may be metal, wood or other material. In many places tanks are supported at some considerable elevation so that water or other fluid therefrom may be forced through pipes to a desired discharge point. In certain parts of the West water tanks are elevated to considerable height so that the water may be distributed as desired with a desired pressure. When tanks are thus elevated or positioned in some more or less out of the way place it is difficult to always know the water level therein. In the present invention a gauge has been provided which will show either at a distance or near the exact water level in the tank. When the expression "water level" is used it will be understood that other liquids may be gauged or indicated.

As shown particularly in Fig. 2, the tank 1 is provided with a rather low level of liquid 3 which supports a float 4. This float may be a piece of wood, hollow metal or other material. The particular structure of the float forms no part of the present invention. However, a U-shaped indicator rod 5 has an inner leg 5' secured by screws or otherwise to the float 4, while the outer leg 5" slides freely in an outside guide 6. The indicator rod 5 is made of a length to permit the float 4 to move down and rest on the bottom when the tank is empty. The outside guide 6 is preferably made from a piece of bent sheet metal so that it will appear as shown in Fig. 4. This guide is secured by nails, rivets, bolts or otherwise to tank 1 and extends from the top to the bottom of the tank and is formed with a base extending flatwise against said tank and a pair of facing portions or arms partially encircling the outside section or leg 5. This guide presents a guiding groove 7 having an opening 8 through which the stem 9 extends. Stem 9 is welded or otherwise rigidly secured to rod 5 which is preferably of metal and preferably tubular as shown in Fig. 4 for the purpose of lightness. A pointer 10 is welded or otherwise rigidly secured to the stem 9 so as to move up and down on the outside of the guide 6 as shown particularly in Figs. 1 and 2.

It will be noted that the indicator rod 5 straddles the wall of the tank and extends above the top thereof. That portion of the rod which extends above the tank projects loosely through an upper guide 11 which is a more or less elliptical tubular member riveted or otherwise rigidly secured to an arc-shaped plate 12. Clamping hooks 13 and 14 are carried by plate 12 and are adapted to hook over the bead 15 on the upper end of tank 1. Some other form of clamp may be used if desired, particularly where the tank is made from wood. If the tank is made from wood, bolts or screws may be used instead of the clamps 13 and 14. The parts are so proportioned that the lower end of the pointer 10 is in line with the level of the liquid 3 at all times. In case liquid was added to the tank, float 4 would move upwardly and would move the pointer 10 in proportion. If some of the liquid was withdrawn, the float would move downwardly and consequently the pointer 10 would move the same distance. Pointer 10 is preferably made of a proper size to be seen at some considerable distance. Also preferably a row of numerals 16 are provided on the tank 1 as shown in Fig. 1 so that not only may the observer see how far the pointer is from the bottom of the tank but may see how many feet of liquid there is still in the tank.

I claim:

1. A depth gauge for liquid carrying tanks including a float, a U-shaped indicator rod comprising an inside section and an outside section, said rod being positioned so that said outside section will extend vertically over part of the outside of said tank with the inside section attached to the float within the tank, a pointer carried by said outside section exteriorly of the tank, an outside guide extending from the bottom to the top of said tank and carried by the tank for guiding the up-and-down movement of said outside section, said outside guide having a base extending flatwise against said tank and a pair of facing portions partly encircling said outside section and an upper tubular guide encircling both of said sections and carried by the upper end of the tank for guiding that part of the rod sections which project above the tank.

2. A depth gauge for tanks comprising a U-shaped indicator rod positioned to straddle the wall of the tank so that one part of the rod will be interiorly of the tank and the other part exteriorly thereof, a float connected with that part of the rod positioned interiorly of the tank, a pointer connected to that part which is exteriorly of the tank, said pointer being positioned to indicate the exact level of the liquid in the tank, said pointer being arranged so that the lower end of the pointer will be in horizontal alignment with the upper surface of the liquid in the tank, and a pair of guiding members coacting to guide said indicator rod as it moves upwardly and downwardly, one of said guide members partly encircling for the full height of said tank that part of the rod which is exteriorly of the tank while the other guide member projects above the tank and encircles and guides both legs of the rod.

3. A depth indicator gauge for a tank comprising a float, a U-shaped indicator rod having an inside leg connected with the float interiorly of the tank and an outside leg positioned exteriorly of the tank, a pointer connected to said outside leg, the lower end of said pointer being substantially in line with the center of said float, an outside guide for guiding said outside leg of said rod, said outside guide extending for the full length of travel of the rod and formed with a pair of facing portions partly encircling said outside leg, and a tubular guide removably connected to the top of said tank positioned to receive both legs of said rod for guiding that part of the rod projecting above the tank.

BEN G. MILLER.